49-292
J. JOHNSON.
Gate.
No. 312.
A. I. Patented Jan'y 29, 1861
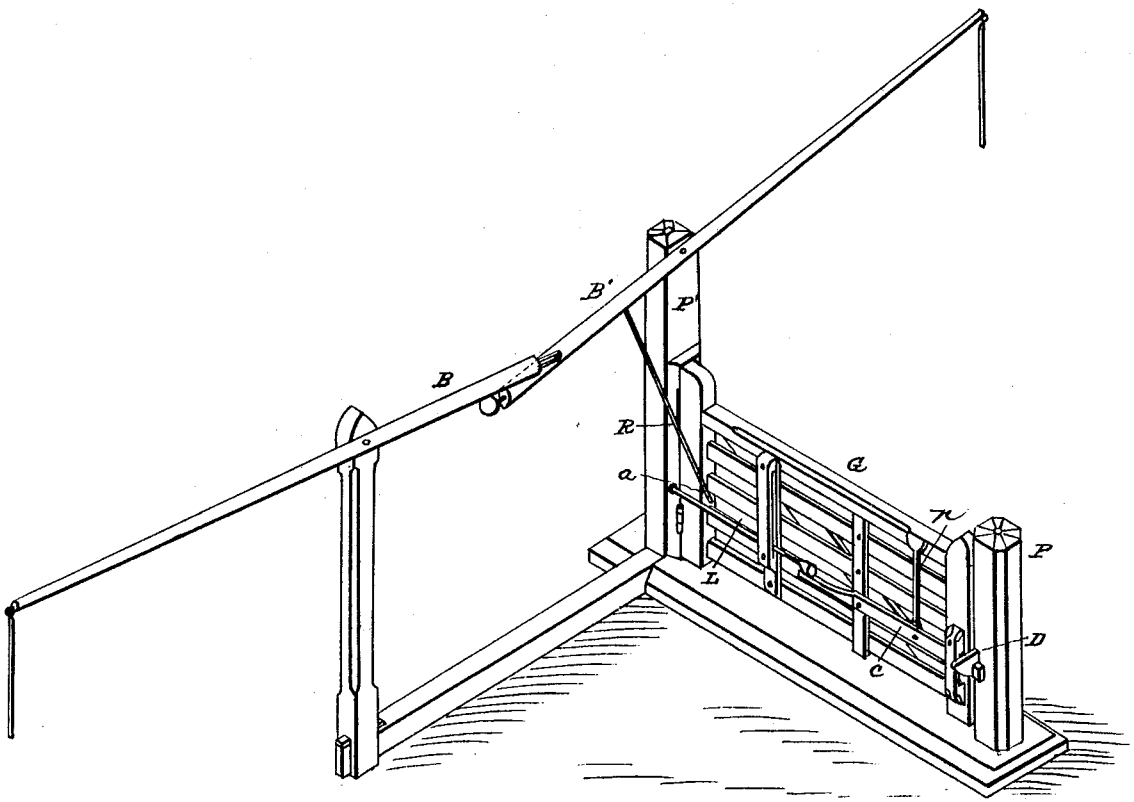
2319
WITNESSES:
Randolph Coxe Jr.
William Sanders
INVENTOR
Joshua Johnson
N. PETERS, Photo-Lithographer, Washington, D. C.